United States Patent
Helber et al.

(10) Patent No.: US 6,303,665 B1
(45) Date of Patent: *Oct. 16, 2001

(54) SPRAY-RESISTANT AQUEOUS FOAM, ITS PRODUCTION AND USE

(75) Inventors: Rudolf Helber, Fliderstadt; Hartmuth Huber, Fellbach; Hans Knoch, Stuttgart; Thomas Pischel, Dettingen; Thomas Reusch, Metzingen/Neuhausen; Werner Walther, Stuttgart, all of (DE)

(73) Assignee: Clariant Finance (BVI) Limited, Tortola (VG)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/403,826

(22) PCT Filed: Sep. 15, 1993

(86) PCT No.: PCT/EP93/02498

§ 371 Date: Jun. 27, 1995

§ 102(e) Date: Jun. 27, 1995

(87) PCT Pub. No.: WO94/06852

PCT Pub. Date: Mar. 31, 1994

(30) Foreign Application Priority Data

Sep. 16, 1992 (DE) ................................. 42 30 997

(51) Int. Cl.[7] .......................... C08G 18/00; C08G 18/48; C08J 9/28

(52) U.S. Cl. .................................. 521/65; 521/72; 521/78
(58) Field of Search .................. 521/65, 72, 78

(56) References Cited

U.S. PATENT DOCUMENTS

| | | | |
|---|---|---|---|
| 3,989,870 | 11/1976 | Bocks et al. | 428/315 |
| 4,029,534 | * 6/1977 | Bocks et al. | 521/65 |
| 4,184,990 | * 1/1980 | Reischl et al. | 521/65 |
| 4,690,953 | 9/1987 | Orr et al. | 521/65 |

FOREIGN PATENT DOCUMENTS

| | | | |
|---|---|---|---|
| 22 64 853 | 7/1975 | (DE) | C08J/9/30 |
| 2190616 | 2/1974 | (FR) | B32B/27/40 |
| WO9200389 | 1/1992 | (WO) . | |

* cited by examiner

Primary Examiner—Morton Foelak
(74) Attorney, Agent, or Firm—Scott E. Hanf

(57) ABSTRACT

Aqueous spray-resistant and pourable foams (S), produced by mechanical foaming of corresponding aqueous compositions (W), wherein the aqueous phase contains (A) a curable polymer system, which consists of
 (U) an ionomeric polyurethane or a mixture of ionomeric polyurethanes and optionally
 (P) one or more further polymers curable at least together with (U), and (B) at least one foam-stabilizer and the liter-weight of (S) at 20° C. and normal pressure is in the range of 400 to 700 g, are eminently suitable for foam-coating of corresponding substrates, in particular of leather.

31 Claims, No Drawings

SPRAY-RESISTANT AQUEOUS FOAM, ITS PRODUCTION AND USE

In the coating of various substrates with foamed aqueous compositions in which it is desired that the foam structure is maintained in the coating and where the compositions are aqueous compositions containing a hardenable polymer, the foam may be produced in various ways, e.g. by a chemical reaction of the components with development of gasous reaction products or by addition of suitable blowing agents or further by mechanical foaming of the composition with an added inert gas, in particular with air.

Since by mechanical foaming there are, in general, obtainable finer foam structures than with gases generated in situ, it is desired to employ mechanically formed foams—at least in those cases, in which the fineness of the foam structure plays a role. In mechanically formed foams an undesired appearance is, however, the instability of the generated foam, which means that for instance during provisional storage the foam is, at least in part, altered by collapsing or subsiding and/or may loose its foam structure during application, in particular when using spraying apparatuses, so that it is practically impossible to apply the foam as such on a substrate with conventional spray-apparatuses (especially with spray-guns). In their production these unstable foams are mostly expanded to such a degree at the point of discharge from the foaming machine, that also by this a collapsing of the foam is favoured.

It has now been found that employing the components stated below there may be obtained very fine and stable aqueous foams, which are of such a stability, be it during intermediate provisional storage, be it during processing, that they can be applied in the form of foam even with conventional spray-apparatuses (in particular spray-guns) and also after drying the foam structure is substantially maintained.

The invention relates to the below defined aqueous foams, their production and use.

A first object of the invention, thus, is an aqueous, spray-resistant foam (S) produced by mechanical foaming of a corresponding aqueous composition (W), wherein the aqueous phase contains (A) a curable polymer system, which consists of
  (U) an ionomeric polyurethane or a mixture of ionomeric polyurethanes and optionally
  (P) one or more further polymers curable at least together with (U),
and (B) at least one foam-stabilizer,
and the liter-weight of (S) at 20° C. and normal pressure is in the range of 400 to 700 g.

As polyurethanes (U) come, in general, into consideration conventional ionomeric polyurethanes, in particular those dispersible in water, principally as are obtainable by the reaction of dimethylolalkane-carboxylic acids and diols, in particular macrodiols, with diisocyanates and optionally diaminocompounds.

As diisocyanates come, in general, into consideration conventional diisocyanates, preferably those in which at least a part thereof is aliphatic, in particular aliphatic (open-chain or/and at least in part cycloaliphatic) or/and aromatic diisocyanates.

The diisocyanates contain in the hydrocarbon radical, to which the two isocyanate groups are bound, advantageously 6 to 15 carbon atoms.

As aliphatic open-chain diisocyanates come into consideration, e.g. hexamethylenediisocyanate or trimethylhexylene-1,6-diisocyanate (in particular 2,2,4-trimethylhexylene-1,6-diisocyanate and 2,4,4-dimethylhexylene-1,6-diisocyanate). As cyclic diisocyanates come principally into consideration mono- and dicyclic diisocyanates, e.g. 2,4- or 2,6-tolylenediisocyanate, m-phenylenediisocyanate, xylylenediisocyanate, 4,4'-diphenylmethane-diisocyanate, 3,3'-dimethyl-4,4'-diphenylmethanediisocyanate, dicyclohexyl-methane-4,4'-, -4,2'- or -2,2'-diisocyanate wherein each cyclohexyl radical may optionally further bear a methyl group, 1,3-cyclohexylenediisocyanate, methylsubstituted 1,3-cyclohexylenediisocyanate and isophoronediisocyanate.

Among the mentioned diisocyanates the aliphatic ones (open-chain or/and cyclic) are preferred.

According to a preferred feature of the invention there are employed open-chain and cycloaliphatic diisocyanates, the molar ratio of the cycloaliphatic to the non-cyclic diisocyanates being advantageously in the range of 0.8:1 to 3.5:1, in particular 1:1 to 3.2:1.

As diols come, in general, into consideration known diols as are employed for polyurethanes dispersible in water, principally macrodiols, in particular polyetherdiols, polyesterdiols or polyesteretherdiols, among which polyalkyleneglycols are preferred, in particular polypropyleneglycols, polybutyleneglycols and mixed polypropylene- and -butyleneglycols. The polybutyleneglycols are principally those comprising oxygen-linked butylene-1,2-, -1,3-, 2,3- or -1,4-groups. Polypropyleneglycols and polybutyleneglycols, or corresponding mixed polyetherdiols, are principally addition products of the corresponding cyclic oxides (in particular oxiranes or tetrahydrofuran) to water or starting diols, which in particular contain 2 to 6 carbon atoms, e.g. ethyleneglycol, propyleneglycol, butyleneglycol, neopentylglycol or hexamethylenediol. Polypropeleneglycols are preferred.

The average molecular weight $\overline{M}_W$ of the macrodiols is preferably in the range of 300 to 5000. By suitable choice of the diols the properties of the polyurethanes may be influenced. A preferred group of diols are lower-molecular macrodiols, in particular polyetherdiols with an average molecular weight $\overline{M}_W$ in the range of 500 to 1800, in particular 800 to 1500. A further preferred group of diols are higher molecular macrodiols, in particular polyetherdiols, with an average molecular weight $\overline{M}_W$ in the range of 1000 to 5000, preferably 1200 to 4000, in particular 1500 to 3500. The difference between the two molecular weights is advantageously in the range of 200 to 3000, preferably 400 to 2200.

When using those categories of macrodiols the weight ratio of the lower molecular ones to the higher molecular ones is advantageously in the range of 1:0.4 to 1:4, preferably in the range of 1:0.7 to 1:3.

As dimethylolalkanecarboxylic acids that can be employed for the production of the ionomeric polyurethanes come, in general, into consideration known carboxylic acids as are employed as carboxy-group-containing diols in the production of ionomeric carboxy-group-containing polyurethanes, in particular α,α-dimethylolalkane-carboxylic acids. Principally they correspond to the formula

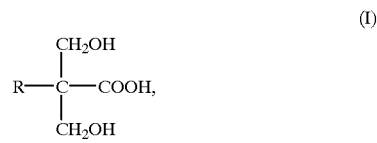

(I)

in which R signifies hydrogen or $C_{1-8}$-alkyl.

Preferably R signifies hydrogen or $C_{1-4}$-alkyl, in particular hydrogen or methyl.

The molar ratio of the total non-ionogenic diols, in particular macrodiols, to the carboxy-group-containing diol is advantageously in the range of 1:0.2 to 1:2, preferably in the range of 1:0.3 to 1:1.2.

Per mole of total employed diol compounds (macrodiols and carboxy-group-containing diols) there are employed advantageously 0.9 to 3 moles of isocyanate compounds. If the diols and isocyanates are reacted to isocyanate terminated oligourethanes, which are then chain-extended with diamino compounds, the molar ratio of the total diol compounds to the isocyanate compounds is advantageously in the range of from 1:1.05 to 1:2.5, preferably 1:1.2 to 1:2.2. The polyaddition of the isocyanate-compounds and diol-compounds may take place in a manner known per se, e.g. in the presence or absence of solvents (as solvents come, in particular, into consideration aprotic solvents, e.g. dialkylketones, such as methylethylketone, cyclohexanone or aliphatic carboxylic acid esters such as acetic acid ethylester or ethoxyethylester, which may optionally be blended with aromatic solvents such as toluene or xylene—preferably there are however employed no aromatic solvents), at elevated temperature (e.g. in the temperature range of 40° C. to reflux temperature) and, if desired, in the presence of suitable catalysts, such as tinn-II-octoate or dibutyltinndilaurate. Preferably the process is carried out in the absence of any solvents and catalysts. The temperature is kept advantageously in the range of 70 to 90° C., preferably 75 to 85° C.

The reaction of the diisocyanates with the diols is suitably as complete as practicable, whereby the presence of at most 5 val-%, preferably at most 2 val-%, (referred to the originally employed diols) of reactive alcoholic hydroxy groups not reacted with isocyanate may be tolerated.

Prior to an optional chain extension of the ionomeric oligourethanes or polyurethanes with diamino-compounds the carboxy groups may, if desired, be converted at least in part to a salt form. For salt formation are suitable conventional, in particular monovalent cations, e.g. alkali metal cations ($Li^+$, $K^+$or preferably $Na^+$), disubstituted cyclic ammonium (e.g. morpholinium) or preferably trisubstituted ammonium. With particular advantage for salt formation are employed hydrosoluble trialkylamines in which the alkyl radicals contain each preferably 1 to 4 carbon atoms. Among the trialkylamines triethylamine is particularly preferred.

For the formation of the cation there is advantageously employed such an amount of base, preferably such an amount of tertiary amine, that at least 90 val-X of the carboxy groups in the prepolymer are present in salt form, in particular such an amount that at most 98 val-% of the titratable carboxy groups are present in salt form. With particular preference there is added such an amount of base, respectively of trialkylamine, that the pH-value of an aqueous 30 %-composition of the final poly(urea)urethane (U) is at least 7, advangageously 7 to 9, in particular 7 to 8.5.

As diamino compounds for an optional chain-extension are suitable known diamino compounds, principally aliphatic, saturated, open-chain or cyclic diamines with 2 to 10 carbon atoms in the aliphatic radical or also hydrazine; e.g. cyclohexylenediamine, isophoronediamine, ethylenediamine, propylene-1,2- or -1,3-diamine, hexamethylenediamine and 2,2,4- and/or 2,4,4-trimethylhexylene-1,6-diamine, among which the lower molecular open-chain diamines with 2 to 6 carbon atoms, in particular propylene-1,3-diamine and propylene-1,2-diamine, and isophoronediamine are preferred, or even hydrazine, the latter being preferably employed in the form of the hydrate.

The reaction of the diisdcyanate-terminated oligourethanes with the diamino-compounds takes place advantageously in aqueous medium, optionally in the presence of further diisocyanate. The diamino-compounds are advantageously employed in such amounts that there is achieved a reaction as complete as possible of the available isocyanate groups. With particular preference the chain extension with the diamino-compounds is conducted in such a way that in the final product no isocyanate groups are any more titratable and the product contains primary amino groups or preferably in the product also no primary amino groups are any more titratable. The reaction with the diamino compounds takes place expediently in aqueous medium as described above, advantageously in the temperature range of from 10 to 35° C. The chain extension is carried out advantageously up to 80 to 99% of theory, preferably up to 88 to 97% of theory.

If desired for chain extension there may be employed a preferably simple diol instead of the diamino compound, e.g. a $C_{2-6}$-alkane diol, as mentioned above, or chain extension may be brought about with a diamino compound and diol. As (U) are preferred ionomeric polyureaurethanes that are obtainable as described above from polyetherdiols, dimethylolcarboxylic acids of the formula (I), diisocyanates and diamino compounds.

The polyurethanes (U) have, upon fixation on the substrate by thermal treatment (in particular after the drying as described below), the character of elastomeric polyurethanes.

If desired, the ionomeric polyurethanes (U) may be blended with other dispersible or dispersed polymers (P) which are curable at least together with (U). As curing there is intended here essentially the principally physical fixation achieved by the drying of the foam on the substrate. As (P) are suitable in particular dispersible or dispersed non-ionomeric poly(urea)urethanes, (meth)acrylic (co)polymers and/or butadiene(co)polymers (e.g. butadiene/acrylonitrile). As non-ionomeric dispersible poly(urea)urethanes are principally suitable known polyurethanes, in particular those obtainable from the above mentioned macrodiols, diisocyanates and optionally chain-extenders and which are advantageously hydroxy-terminated or/and amino-terminated. As (meth)acrylic (co)polymers are principally suitable known dispersible products; in particular those usable for leather base-coats or as blends for leather coats, e.g. (co) polymerisation products of (meth)acrylic acid alkyl esters in which the ester-forming alkyl radicals are optionally in part hydroxy-substituted; the unsubstituted alkyl radicals contain e.g. 1 to 12 carbon atoms, the hydroxy-substituted ones contain e.g. 2 to 4 carbon atoms; optionally there may be present non-ionogenic constituting comonomers, e.g. ethylene, acrylonitrile or optionally N-methylolated acrylamide, and/or anionic comonomers, e.g. (meth)acrylic acid and/or itaconic acid. The (meth)acrylic (co)polymers may optionally contain minor amounts of alkylsiloxane resp. silicone constituents.

In the compositions (W) to be foamed respectively in the foams of the invention there are preferably employed as (U) ionomeric polyureaurethanes, especially those described above, preferably in which the macrodiols are mixtures of higher-molecular and lower-molecular macrodiols and which are obtained by chain-extension of isocyanate-terminated oligourethanes with diamino compounds as described above.

If in (A) are present polymers (P), their proportion amounts to advantageously 5 to 70, preferably 5 to 60, in particular 10 to 50% by weight of (A). The (U)-content in (A) amounts advantageously to 30 to 100% by weight, preferably to 40 to 100% by weight, in particular to 50 to 100% by weight.

As foam stabilizers (B) there may be employed known compounds, e.g. hydrosoluble fatty acid amides, hydrocarbon sulphonates or compounds with soap character (fatty acid salts) e.g. those in which the lipophilic radical contains 12 to 24 carbon atoms; in particular alkane sulphonates with 12 to 22 carbon atoms in the hydrocarbon radical, alkylbenzene sulphonates with 14 to 24 carbon atoms in the total hydrocarbon radical, or fatty acid amides or soap-kind fatty acid salts of fatty acids with 12 to 24 carbon atoms. The hydrosoluble fatty acid amides are preferably fatty acid amides of mono- or di-($C_{2-3}$-alkanol)-amines. The soap-kind fatty acid salts may, e.g. be alkali metal salts, amine salts or unsubstituted ammonium salts. As fatty acids come in general into consideration known compounds, e.g. lauric acid, myristic acid, palmitic acid, oleic acid, stearic acid, ricinoleic acid, behenic acid, or arachic acid, or also technical fatty acids, e.g. coconut fatty acid, tallow fatty acid, soya fatty acid or technical oleic acid, and their hydrogenation products. Particularly preferred are unsubsituted ammonium salts of higher saturated fatty acids, in particular of those with 16 to 24 carbon atoms, principally of stearic acid and of hydrogenated tallow fatty acid. The foam-stabilizers are suitably such that they are neither decomposed under foaming conditions nor under application conditions. As ammonium salts come suitably into consideration those whose decompostion temperature is $\geq 90°$ C., preferably $\geq 100°$ C. The weaker anionic stabilizer ($B_1$), principally the carboxylic acids or their fatty amides, may, if desired, be combined with stronger anionic surfactants ($B_2$), in particular with the above-mentioned sulphonates or preferably with fatty alcohol sulphates, advantageously in the form of their salts (alkali metal or ammonium salts as mentioned above), e.g. in the weight ratio ($B_1$)/($B_2$) in the range of 95/5 to 50/50, advantageously 85/15 to 65/35.

The foams (S) may contain further additions depending on the envisaged application purpose thereof, principally (C) at least one dye, (D) at least one flow control agent and/or wetting agent, (E) at least one antiblocking agent ($E_1$) and/or plasticizer ($E_2$), (F) at least one delustering agent and/or (G) at least one UV-absorber or/and at least one antioxidant.

Expediently the foam compositions of the invention are free of additions of high volatility which have an unfavourable influence on the foam cells, in particular of those solvents that are highly volatile or boil at or below application temperature. Preferably any further solvents are also avoided. The presence of minimal amounts of non-volatile solvents from the production of (U) or (P) may, however, be tolerated; their proportion should, however, not exceed 5% by weight, in particular 2% by weight, of (A).

As dyes (C) there may be employed any suitable dyes as are employed for the dyeing (in particular pigmenting) of polyurethane in the mass, principally disperse dyes or in particular pigments, which may suitably be dispersed with the aid of dispersants. The pigments may be compounded with conventional thickeners, e.g. with thickeners based on optionally modified carbohydrates, e.g. modified cellulose (in particular hydroxyethyl- or hydroxy-methyl-cellulose); the use of proteinaceous thickeners (e.g. caseine) is advantageously avoided in the foams (S) of the invention, since they may have a negative influence on the foam behavior. The (C)-content in the compositions (W) is e.g. $\leq 15\%$ by weight and may vary depending on the dye respectively pigment and on the substrate and the desired effect; very good colour effects may already be achieved with pigment contents $\leq 10\%$ by weight, in particular in the range of 0.1 to 8% by weight. Occasionally, commercially available compounded aqueous pigment pastes may contain minimal amounts of defoamers (e.g. about 5% by weight or less, referred to pure pigment); their content in the total composition (W) resp. (S) is however so small that they have no substantially disturbing influence on (S).

As flow control agent or wetting agent (D) are suitable, in general, conventional substances with surface-active character, in particular those with wetting agent or solubilizer character, as are employable in polyurethane coatings, in particular e.g. aminofunctional polysiloxanes (not defoamers), perfluoroalkyl surfactants (e.g. anionactive ones, such as phosphates, sulphates and carboxylates, or non-ionogenic ones, such as alkanolamides) or non-ionogenic solubilizers [e.g. mono- or diethyleneglycol-mono-($C_{1-6}$-alkyl)-ether, in particular -mono-($C_{3-4}$-alkyl)-ether]. If these flow control or wetting agents are employed, their proportion referred to (W) is advantageously in the range of 0.05 to 2% by weight, preferably 0.1 to 1% by weight.

As antiblocking agents ($E_1$) there may be used known products, e.g. waxes, advantageously with a softening point in the range of 45 to 130° C., preferably 48 to 105° C., (e.g. mineral waxes, synthetic waxes or/and ester waxes, such as montan wax, carnauba wax, ozokerite or bees wax), fats and oils (e.g. mineral oils boiling above 250° C.) or optionally modified animal or vegetable fats or oils or even corresponding surrogates (synthetic oils) or (non-defoaming) polysiloxanes, among which the oils are preferred. These waxes, fats, oils and polysiloxanes may optionally be dispersed with suitable emulsifiers, e.g. non-ionogenic emulsifiers, in particular sorbitanmonoesters of higher fatty acids, such as sorbitan-monooleate or -monostea-rate, oxyethylated fatty alcohols, oxyethylated alkylphenols and/or oxyethylated sorbitanmono- or -diesters of higher fatty acids and/or (especially fats or oils) by sulphation; the fatty acids and fatty alcohols contain advantageously 12 to 24 carbon atoms, the alkylated phenols contain principally one or two alkyl radicals containing each 3 to 12, preferably 4 to 9, carbon atoms; the degree of oxyethylation is advantageously so high that the surfactant has hydrophilic resp. O/W-emulsifyer character. Optionally there may be employed also ani6nactive surfactants, in particular carboxymethylation products or sulphatation products of the mentioned non-ionogenic surfactants or optionally of their non-oxyethylated starting materials.

To the polyurethanes there may optionally also be added plasticizers ($E_2$), e.g. such as defined and described in A.K. Doolittle "The Technology of Solvents and Plasticizers" edited by J. Wiley and Sons Ltd., under the heading "Plasticizers" and in particular "Softeners", especially in chapter 16, or in Dr. E. Karsten "Lackrohstoff-Tabellen", 7th edition, Curt R. Vincentz Verlag, under the heading "Weichmacher" in chapter 34. As plasticizers there may principally be mentioned esters of polybasic acids (phthalic acid, adipic acid or sebacic acid) of optionally oxyalkylated aliphatic alcohols (e.g. with 1 to 20 carbon atoms), ($C_{1-12}$-alkyl)-phenols or benzylalcohol, or alkylesters of epoxidized fatty acids (e.g. of technical unsaturated fatty acids with 16 to 22 carbon atoms). The mentioned plasticizers and antiblocking agents may be added in conventional concentrations to the polyurethanes, e.g. in amounts of 1 to 50, preferably 2 to 30% by weight of the employed polyurethane (U), in particular polyureaurethane.

Per 100 parts of weight of (A) there are, advantageously, employed 0 to 20, preferably 2 to 15 parts by weight of (E).

As delusterants (F) come, in general, into consideration conventional substances, especially of such a kind and in such amounts as are employed in delustering and pigmenting of plastics, in particular polyurethane plastics. As delusterants come e.g. into consideration waxes or silicate-containing substances, e.g. microwaxes, fatty clays, amorphous silica and caolin. These are expediently compounded into a binder, preferably into a polyurethane (e.g. in a colloidal mill) to a master batch and employed in this form.

As UV-absorbers and/or antioxidants (G) there may be employed conventional substances. These may be already contained in the respective polymers. Preferably there are added no UV-absorbers and/or antioxidants (G) into the compositions (V).

According to a further feature of the invention there may be added cross-linking agents to the compositions of the invention, e.g. polyisocyanates or polyaziridines in amounts as suitable for the respective (partial) cross-linking. Among these are to be particularly emphasized the N-substituted polyaziridines, in particular 1,1,1-tri-[β-(ethyleneaziridino)-propionyloxyl-propane. By the cross-linking with the mentioned polyvalent cross-linking agents there may, if desired, be modified the soft-handle, the stretchability and the resilience of the finishings. Preferably there are employed no cross-linking agents.

By suitable choice of the kind and amount of the components there may be influenced the properties of (S), be it in view of the substrate to be coated, be it in view of the physical properties of the foam or/and of the coating produced therewith.

By the addition of oils or waxes, in particular of paraffin waxes, e.g. among components (E) or (F), it is e.g. possible to counter an optional crack-formation in the foam surface during the drying or under aerodynamic stress (e.g. when aerating in the tunnel drier) or even at relatively high temperatures, e.g. between 65 and 80° C. For this suffice e.g. concentrations $\leq 6\%$ by weight, referred to (W).

The foams (S) of the invention are expediently produced by mechanical foaming of corresponding aqueous compositions (W) that contain the required components (A) and (B) and optionally the further additions [(C), (D), (E), (F) and/or (G) and/or optionally further suitable additives as mentioned above].

The compositions (W) to be foamed may be produced by plain admixture of the respective components, for which the respective components are preferably employed directly in the form of aqueous compositions as they are formed in their production and/or formulation, and after admixing of the active substances the water content may if required be corrected. The polymers (U) and (P) may e.g. be employed in the form of aqueous concentrated compositions, each with a dry substance content e.g. of 10 to 60% by weight, preferably 12 to 50% by weight (depending on the hydrodispersability of the respective polymers).

The foam-stabilizer (B) is expediently employed in an efficient amount, which is to be chosen so that in the desired time and with the desired fineness and firmness of the foam in concomitance with (A) there is achieved the desired stability. Depending on the kind of the components and their content in (V) the efficient or optimal concentration respectively of (B) may vary and may, in general, range in a broad scope, e.g. at concentrations $\leq 15\%$ by weight of (B); depending on (U) and optionally (P) a relatively stable foam may already result at concentrations of 0.1% by weight or 0.2% by weight of (B). Advantageously there are employed 2 to 15% of (B) in total in (V). Also with relatively small amounts of (B) there may be achieved efficient foams, e.g. with 1 to 8 Z by weight of (B), in particular also $\leq 5\%$ by weight of (B), referred to the total quantity of (V).

The suitability of (V) to be foamed in a determined foam-beater in the desired fineness to a foam (S) may be directed not only by the construction of the foam-beater, but also by the viscosity (in particular the Ford Cup viscosity) of (V). The Ford-Cup-viscosity of (V) measured in a Ford Cup no. 4 is advantageously 18 to 50, principally 18 to 35 seconds, preferably 20 to 32 seconds, with particular preference 25 to 30 seconds. If the Ford-Cup-viscosity is higher than the desired value the composition may be diluted correspondingly with water [preferably not more than 5% of water, referred to the total weight of (V)]; if the viscosity is too low, then the composition may be set to the above-mentioned viscosity by addition of a suitable thickener, e.g. on polyurethane basis, on polyamide basis or caseine basis.

The foaming of (V) may be carried out in commercially available suitable foam-beaters, expediently in such a foam-beater that is built and operated in such a way that during mixing a swirl-formation as dense, regular and fine as possible, takes place and consequently a correspondingly fine distribution of the air in (V) takes place and the desired foam fineness is achieved. A pressure fall as minimal as possible at the point of discharge from the foam-beater favours the fineness of the foam.

The foams (S) of the invention have at 20° C.and normal pressure a liter-weight which is advantageously in the range of 480 to 700 g, e.g. 480 to 680 g, preferably 480 to 640 g, with particular preference 500 to 600 g.

The foams (S) of the invention have advantageously a foam cell size, which substantially is smaller than 500 $\mu$m and is e.g. in the range of 0.1 to 200 $\mu$m, in particular 0.2 to 100 $\mu$m, whereby occasionally single foam bubbles may also be larger due to confluence, e.g. in the range of 200 to 1000 $\mu$m or even only 100 to 500 $\mu$m.

The foams (S) of the invention are so stable that they substantially maintain their foam structure even after intermediate storage for several hours and are also readily pourable—optionally with small surperatmospheric pressure (e.g. >0.1 bar, e.g. 0.1 to 1 bar). The stability of the foams (S) of the invention may also be recognized by means of the pouring cone, i.e. the conic cavity that is formed by pouring of the foam (S) through a round, funnel-shaped opening on a foam blanket of the same foam (S) in this foam blanket. Advantageously the foams (S) of the invention are so stable that, when continuously pouring the foam under a superatmospheric pressure of 0.6 bar through a round funnel-opening of 1 cm diameter from a height of 10 cm on a foam blanket of at least 20 cm of thickness of the same foam (S), a conic cavity of at least 0.3 cm, advantageously 0.4 to 2 cm, preferably 0.5 to 1.5 cm depth is formed in this during pouring, and which after interruption of the pouring jet flattens again—macroscopically observed—within at most 5 seconds, e.g within 0.2 to 5 seconds. The foam (S) is pourable through a funnel-opening of 0.5 to 3, in particular 0.6 to 2 cm diameter under the action of a superatmospheric pressure in the range of 0.1 to 1 bar in a continuous flow and without interruption.

For foaming the aqueous compositions (V) to the foams (S) of the invention are suitable in particular mixers (M) that are capable of generating a correspondingly fine foam, especially coaxial rotor/stator mixers, in which the cylindric inner part of the mixer head connected to the rotor ("club") is provided with radially firmly fitted (preferably edged) pegs at the cylinder wall, and the cylindric portion of the mixer-head ("housing") connected to the stator is also provided with radially firmly fitted (preferably edged) pegs at the inner wall, so that when operating the mixer the rotor pegs comb through the stator pegs and, by feeding of (V) and air at one end of the mixer head, an efficient foaming takes place in the mixer head and at the other end of the mixer head a substantially non-expanded foam (S) is discharged. By the choice of length, density and shape of the pegs in concomitance with the foreseen rotational speed, the volume of the mixer, the feeding-speed of the aqueous composition (V) and the inlet-pressure of the air, there may be achieved an optimum fine foaming of the compositions (V) to stable spray-resistant foams (S). By suitable choice of the parameters in concomitance with the selection of (V) there may be achieved with minimal air-overpressure an optimum foam (S), e.g. at a superatmospheric pressure up to 5 bar, preferably in the range of 0.1 to 1.5, in particular 0.2 to 0.9 bar.

The foam (S) of the invention produced in this way, in particular with an air overpressure $\leq 1$ bar, is discharged practically without relaxation from the mixer, as the minimal air-overpressure is compensated to a large extent during the foaming itself and even if a minimal overpressure might still be present in the foam cells, this does not lead to undesired foam modification appearances due to the high firmness of the foam cells structure.

The aqueous foams (S) of the invention are suitable for the production of such coatings as can be produced from the respective ionomeric polyurethanes (U), in particular for the production of thermoplastic foamed coatings. As substrates for the coatings are suitable in general any conventional hard or stretchable and/or flexible substrates. As hard substrates there may be mentioned e.g. stone and stone-like materials, metal, wood and synthetic materials. As flexible and/or stretchable substrates there may be mentioned e.g. textile material (e.g. woven or knitted goods, webs or felts or further—for the coating of the backing—also carpets and velours), paper, fibreboard, cardboard, plastics and leather. Since with the foams (S) of the invention there are obtainable coatings of particularly pronounced stretchability and flexibility and of particularly pronounced resilience, they are particularly suited for coatings on flexible and/or stretchable substrates, and therefore also particularly preferred for this latter purpose. They are, before all, preferred for those substrates to which particularly high requirements are set with regard to flexibility, stretchability and resilience, e.g. synthetic leather and especially tanned leather (e.g. for upholstery, footwear, clothing, suitcases, handbags, and fancy goods). The leathers may have been tanned and optionally dyed and/or fatted as desired.

The application may be carried out in very simple way using application methods conventional per se for the application of foam, e.g. by application with a doctor blade or coating with a roll or principally by spraying with suitable spray guns, conventional per se, e.g. with or without air feed, e.g. with so-called airless or air-mix spray-guns or preferably with low pressure guns (in particular with so-called HVLP—<u>H</u>igh <u>V</u>olume <u>L</u>ow <u>P</u>ressure—guns). In this it is to be observed that in the spray-guns with air-inlet the air serves essentially only for the convection of the foam and it is surprising that in the foam convection in spray-guns as well with as also without air-inlet (in particular such of the mentioned kind) the foam structure of (S) is maintained during spraying insofar as it is applied on the substrate in the form of foam of the same kind and may be fixed thereon in the form of foam. Particularly suitable is the application by spraying or with a roller-coater.

For the application of the foam (S) of the invention with low-pressure guns, especially with HVLP-guns, is suitable e.g. a nozzle/needle of 1 to 2.5 mm, preferably 1.5 to 2 mm. The spraying with the HVLP-gun using the foam (S) of the invention is distinguished by a lower nebulization (spray-loss) then with the airless or air-mix process. When using airless or air-mix guns, are suitable e.g. nozzles of a calibre of 0.1 to 1 mm, preferably 0.3 to 0.6 mm. In the application with a roller-coater it is to be checked that the roller-coater is fitted for foam application, i.e. is provided with a hard doctor blade and a device for the exact adjustment of the blade level (micro-fine ajustment), in order to regularly apply foam films of different thicknesses on the roll. The blade distance from the roll may range e.g. in the scope of 0.1 to 0.4 mm, preferably 0.15 to 0.22 mm. In the application with the roller-coater it is essential that the foam be fed continously, which can be regulated by means of a feeding distributor and is very well possible with the readily pourable foam (S) of the invention.

The foams (S) of the invention are advantageously applied in such amounts that the quantity of application of (A), in particular on leather, is in the scope of 5 to 70 g/m$^2$, preferably in the scope of 7 to 60 g/m$^2$. Referred to the foam the quantity of application of (S), in particular on leather, is advantageously in the range of 50 to 300, principally 80 to 300, e.g. 80 to 280, preferably 80 to 250 g/m$^2$. The preferred quantities of application may vary depending on the substrate, thus e.g. for the finishing of split leather preferably 200 to 250 g (S)/m$^2$, for buffed leather 100 to 150 g (S)/m$^2$ and for full-grain leather 80 to 120g (S)/m$^2$. The optimum ranges may also vary slightly depending on the application technique; thus e.g. with HVLP-guns are preferred quantities of application in the range of 80 to 200 g/m$^2$, whereas with airless and air-mix guns are preferred quantities of application in the range of 120 to 250 g/m$^2$. By means of the application with the roller-coater there may be achieved foam-films of a very regular height.

The leather substrates may optionally be previously coated with a base-coat, e.g. depending on the substrate and/or on the desired effect, as an adhesive coat, impregnation coat or plain base coating. For the base coat there may be employed conventional, preferably aqueous compositions containing at least one corresponding polymer, e.g. an optionally ionomeric poly(urea)urethane, a (co)polyacrylate or/and a (co)polybutadiene. For the adhesive coat there are preferalby employed polyurethanes that are preferably hydroxy-terminated and are composed of polyesterpolyols, short chain diols and aromatic and optionally aliphatic diisocyanates. These base coat compositions may be applied on the substrate and dried in a manner conventional per se.

The substrates, in particular leather, on which the foam (S) of the invention has been applied can be dried in a manner conventional per se—suitably in a tunnel drier. For the drying of leather coated with the foam (S) of the invention are suitable in particular temperatures $\leq 80°$ C., preferably in the range of 55 to 75° C., in the tunnel drier, for which the suitable length of the tunnel drier may vary depending on the kind of leather (e.g. from 10 to 20 m, with returning conveyance drier system also only 10 to 15 m). The dried layer may, if desired, be directly ironed or/and embossed. For ironing there may be employed temperatures e.g. $\leq 75°$ C., advantageously 40 to 70° C., in particular in the range of 50 to 70° C., for embossing $\leq 95°$ C., advantageously 50 to 90° C., in particular in the range of 50 to 75° C. The pressure may be in any desired range, e.g. up to 260 bar, principally $\leq 250$ bar.

The coatings of the invention with the foam (S) are preferably finishing that correspond to an intermediate coat and may also be repeated several times; there may, e.g. be carried out two or even three consecutive coatings with (S). In general only one application is already sufficient or even, depending on the desired effect and leather substrate, also two applications with the foam (S).

The coatings of the invention are, however, also compatible with other coatings, suitably such coatings that substantially do not impair the foam structure, in particular aqueous-based ones that may be foamed or not foamed. For particular colour effects there may e.g. be carried out a colour application with an aqueous non-foamed dispersion, containing a pigment and a binder in dispersed form. For this purpose are suitable, in general, also known colour application compositions. As pigments there may be employed e.g. those mentioned above under (C). As binders come into consideration e.g. polymers known for this purpose, e.g. those mentioned above as "thickening agents" or also as mentioned below for the top-coat. The application of these colour compositions is carried out advantageously by overspraying, e.g. once or twice, of the material that has been coated with (S) and dried.

The substrates coated with (S) and optionally with at least one pre-top coating (e.g. an additional colour application composition) are advantageously coated with at least one top-coat. The top-coating may be carried out in a manner known per se on the dried previous coating and using conventional products.

There may e.g. be used top-coats (in particular top-lacquers) that are casein-based, cellulose acetobutirate-based, polyurethane-based, nitrocellulose-based or epoxy-resin-based (among which are preferred the polyurethane-based ones, the nitrocellulose-based ones and the epoxy-resin-based ones), e.g. clear, delustered or/and colour-containing (in particular pigment-containing) coats, depending on the desired effect. The top-coat may be dried in conventional way (e.g. in the tunnel drier) and finally—depending on the desired aspect of the goods—it may be ironed, embossed or/and milled. By means of the fine foam-finishing of the invention there may be achieved particularly fine embossings.

For the final ironing and/or embossing there may also be used somewhat higher temperatures, e.g. 60 to 120° C. the pressures may range in any desired scopes, e.g. between 60 to 260 bar.

Analogously as described above for leather also other substrates may be coated, e.g. synthetic leather or other of the above-mentioned materials.

According to the invention there may be produced foamed finishing of high bond strength and tensile strength and of high hiding power and fastness, which are distinguished by an outstanding flexibility and stretchability and by a particularly good resilience. By the coating of the invention with the foamed compositions (S) there may be achieved with smaller amounts of coating composition than with former non-foamed coating compositions optimum coatings with inferior burdening of the substrate and corresponding energy-saving in drying. They are suitable—optionally with intermediate foamed or non-foamed pre-top colour coat—as base coats for any desired top lacquers, e.g. nitrocellulose-based, poly(urea)urethane-based, epoxy-resin-based, cellulose acetobutirate-based or casein-based, in particular as mentioned above. The finishings produced employing the foam coatings of the invention, in particular leather-finishings, are distinguished by their full and soft handle and by their surprisingly good embossability.

In the following examples the parts and percentages are by weight; the temperatures are indicated in degrees Celsius. The employed trimethylhexamethylene-diisocyanate is an isomeric mixture of even parts of 2,2,4- and 2,4,4-trimethylhexamethylene-diisocyanate-1,6. "F.C." stands for "Ford Cup". "C.I." stands for "Colour Index". The organically dilutable nitrocellulose lacquer employed in (L2), (L3) and (L6) is a nitrocellulose that is dissolved in an organic solvent system 130 parts of butylacetate, 15 parts of methylethylketone, 25 parts of xylene, 15 parts of $C_{2-4}$-alcohols and 15 parts of highboiling components (butylglycolacetate)]. The following compositions and products are employed:

Base-coat Compositions (V1) to (V4)
(V1) aqueous polyacrylic dispersion containing
  20% of polyacrylate impregnation binder (17% of polyacrylic acid ester of 6 parts of acrylic acid, 52 parts of butylacrylate and 38 parts of ethyl acrylate, and 3% of alkylbenzenesulfonate),
  20% of butylglycol,
  60% of water.
(V2) aqeous polyurethanie dispersion containing
  22% of polyureaurethane of 1 mole of polypropyleneglycol $\overline{M}_W$ 2000, 2.1 moles of tolylenediisocyanate and 0.95 moles of ethylenediamine,
  13% of butylglycol,
  65% of water.
(V3) aqeous polyurethane dispersion containing
  22% of polyurethane of 1 mole of polypropyleneglycol $\overline{M}_W$ 2000, 2.3 moles of tolylenediisocyanate, 0.45 moles of triethylamine and 0.5 moles of dimethylolpropionic acid,
  78% of water.
(V4) aqeous polyurethane dispersion containing
  22% of polyurethane of 0.5 mol of polypropyleneglycol $\overline{M}_W$ 1000, 0.5 moles of polypropyleneglycol $\overline{M}_W$ 2000, 2.3 moles of tolylenediisocyanate, 0.45 moles of triethylamine and 0.5 moles of dimethylolpropionic acid,
  78% of water.

Polyurethanes (U1) to (U3)
(U1) Polyureaurethane from the chain-extension of the oligourethane of 6 moles of polypropyleneglycol $\overline{M}_W$ 1000, 0.4 moles of polypropyleneol $\overline{M}_W$ 2000, 1.8 moles of isophoronediisocyanate, 0.3 moles of methylhexamethylenediisocyanate, 0.6 moles of 1,1-dimethylolionic acid and 0.56 moles of triethylamine with 0.93 moles of hydrazinehydrate.
(U2) Polyureaurethane from the chain extension of the oligourethane of 0.8 moles of polypropyleneglycol $\overline{M}_W$ 2000, 0.2 moles of polypropyleneol $\overline{M}_W$ 1000, 2.2 moles of isophoronediisocyanate, 0.6 moles of 1,1-dimethylolpropionic acid and 0.58 moles of triethylamine with moles of hydrazinehydrate.
(U3) ureaurethane from the chain extension of the oligourethane of 0.8 moles of polypropyleneglycol $\overline{M}_W$ 2000, 0.2 moles of polypropylene glycol $\overline{M}_W$ 1000, 2.2 moles of isophoronediisocyanate, 0.6 moles of 1,1-dimethylolpropionic acid and 0.59 moles of triethylamine with 0.95 moles of propylene-1,2-diamine.

Acrylic Polymers (P1) to (P4)
(P1) 39% aqueous dispersion of an acrylic polymer of
  15% of ethylacrylate
  22% of butylacrylate
  2% of acrylic acid.
(P2) 39% aqueous dispersion of an acrylic polymer of 19% of 2-ethylhexylacrylate
18% of butylacrylate
2% of acrylic acid.

(P3) 39% aqueous dispersion of an acrylic polymer of
  30% of butylacrylate
  7% of acrylonitrile
  2% of acrylic acid.

(P4) 41.2% aqueous dispersion of an acrylic polymer of
  25% of butylacrylate
  14% of acrylonitrile
  1.2% of methacrylamide
  2% of acrylic acid.

Flow Control Agent (D1) "Fluorad PC 170 C" of the firm 3M (fluorinated alkylpolyoxyethylene ethanol 95%, 5% water).

Polyurethane Compositions (A1) to (A9)

(A1) Aqueous 30% dispersion of a mixture of 56 parts of (U1) and 44 parts of (U2).

(A2) 32% aqueous dispersion of a mixture of 56 parts of (U1) (added in the form of a 30% aqueous dispersion) and 44 parts of acrylic polymer active substance of (P1) [added in the form of aqueous dispersion (P1)].

(A3) 32% aqueous dispersion of a mixture 56 parts of (U1) (added in the form of a 30% aqueous dispersion) and 44 parts of acrylic polymer active substance of (P2) [added in the form of aqueous dispersion (P2)].

(A4) 32% aqueous dispersion of a mixture of 56 parts of (U1) (added in the form of a 30% aqueous dispersion) and 44 parts of acrylic polymer active substance of (P3) [added in the form of aqueous dispersion (P3)].

(A5) 32% aqueous dispersion of a mixture of 56 parts of (U1) (added in the form of a 30% aqueous dispersion) and 44 parts of acrylic polymer active substance of (P4) [added in the form of aqueous dispersion (P4)].

(A6) 36% aqueous dispersion of a mixture of 40 parts of (U1) and 32 parts of (U3).

(A7) 41% aqueous dispersion of (U1).

(A8) 32% aqueous dispersion of (U2) delustered with 2% of amorphous silica.

(A9) 32% aqueous dispersion of (U2).

Antiblocking Agents (E11) and (E12)

(E11) Aqueous composition with 32% of fat-liquor oil (natural oil) and 3.2% of polyacrylate emulsion.

(E12) Aqueous composition with 32% fat-liquor oil (natural oil), 3.2% of polyacrylate emulsion and 0.02% of polydimethylsiloxane.

Compositions (W1) to (W9)

(W1) Aqueous composition obtained by admixing the following components in the indicated sequence:
  73.1 parts of (A6)
  16.7 parts of demineralized water
  1.2 parts of (D1)
  7.2 parts of ammoniummstearate
  1.8 parts of laurylsulphate sodium salt.
Viscosity in the F.C. 4=25–30".

(W2) Aqueous composition obtained by admixing the following components in the indicated sequence:
  19 parts of pigment preparation (Cx)
  73.1 parts of (A6)
  18.8 parts of demineralized water
  1.2 parts of (D1)
  4.7 parts of ammoniumstearate
  1.8 parts of laurylsulphate sodium salt.
Viscosity in the F.C. 4=25–30".

(W3) Aqueous composition obtained by admixing the following components in the indicated sequence:
  76.1 parts of (A7)
  14.3 parts of demiheralized water
  0.8 parts of (D1)
  6.6 parts of ammoniumstearate
  1.8 parts of laurylsulphate sodium salt.
Viscosity in the F.C. 4=25–30".

(W4) Aqueous composition obtained by admixing the following components in the indicated sequence:
  19 parts of pigment preparation (Cx)
  76.1 parts of (A7)
  16.3 parts of demineralized water
  0.8 parts of (D1)
  4.6 parts of ammoniumstearate
  1.8 parts of laurylsulphate sodium salt.
Viscosity in the F.C. 4=25–30".

(W5) Aqueous composition obtained by admixing the following components in the indicated sequence:
  200 parts of pigment preparation (Cx)
  75 parts of (E11)
  675 parts of (W1)
  200 parts of (A9)
  125 parts of (A8).
Viscosity in the F.C. 4=25–30".

(W6) Aqueous composition obtained by admixing the following components in the indicated sequence:
  200 parts of pigment preparation (Cx)
  75 parts of (E12)
  675 parts of (W1)
  200 parts of (A9)
  125 parts of (A8)
Viscosity in the F.C. 4=25–30".

(W7) Aqueous composition obtained by admixing the following components in the indicated sequence:
  200 parts of pigment preparation (Cx)
  75 parts of (E11)
  700 parts of (W1)
  200 parts of (P2)
  100 parts of (A8).
Viscosity in the F.C. 4=25–30".

(W8) Aqueous composition obtained by admixing the following components in the indicated sequence:
  200 parts of pigment preparation (Cx)
  75 parts of (E11)
  1000 parts of (W3).
Viscosity in the F.C. 4=25–30".

(W9) Compositions (W9.1) to (W9.5): Aqueous compositions obtained by admixing the following components in the indicated sequence:
  190 parts of pigment preparation (Cx)
  1000 parts of (A1)
  X parts of ammoniumstearate.
Viscosity in the F.C. 4=25–30".

(W9.1) x =2.58;
(W9.2) x =23.80;
(W9.3) x =59.50;
(W9.4) x =66;
(W9.5) x =95.20.

The employed pigment preparations (Cx) are pigment preparations compounded with hydroxyethylcellulose, containing in 190 parts of pigment preparation pigments (C) as follows:

(C1) 40 parts of C.I. Pigment White 6
(C2) 30 parts of C.I. Pigment Yellow 34

(C3) 17 parts of C.I. Pigment Blue 15:1
(C4) 12 parts of C.I. Pigment Black 7
(C5) 8 parts of C.I. Pigment Violet 19
(C6) 30 parts of C.I. Pigment Yellow 42
(C7) 40 parts of C.I. Pigment Red 101
(C8) 16 parts of C.I. Pigment Red 170
(C9) 31 parts of C.I. Pigment Red 104
(C10) 40 parts of C.I. Pigment Red 146.

Compositions (W9 bis) to (W9 quinquies)

The compositions correspond to the polyurethane compositions (W9) [specifically (W9.1) to (W9.5)] with the difference that instead of (A1) there is employed the same amount of (A2), (A3), (A4) or (A5) respectively.

Lacquer Compositions (L1) to (L6)

(L1) 90 parts of an aqueous 20% nitrocellulose emulsion delustered with $SiO_2$,
  50 parts of an aqueous colourless 14% nitrocellulose emulsion,
  100 parts of water.

(L2) 100 parts of a colourless organically dilutable 15% nitrocellulose lacquer,
  150 parts of butylacetate.

(L3) 100 parts of a colourless organically dilutable 15% nitrocellulose lacquer,
  20 parts of an organically dilutable 15% nitrocellulose lacquer, delustered with $SiO_2$,
  200 parts of butylacetate.

(L4) 100 parts of an aqueous 20% nitrocellulose emulsion, delustered with $SiO_2$,
  100 parts of water,
  1.5 parts of a polyaziridine-based cross-linker,
  5 parts of polysiloxane (handle-improving agent).

(L5) 200 parts of polyureaurethane from 1 mole of polycaprolactonediol $\overline{M}_W$
  2000, 2 moles of 4,4'-dicyclohexylmethanediisocyanate and
  0.95 moles of 1,2-propylenediamine,
  200 parts of butylacetate.

(L6) 20 parts of polyureaurethane from 1 mole of polycaprolactonediol $\overline{M}_W$
  2000, 2 moles of isophoronediisocyanate and 0.95 moles of isophoronediamine,
  80 parts of a colourless organically dilutable 15% nitrocellulose lacquer,
  100 parts of butylacetate,
  10 parts of an aminofunctional polysiloxane,
  100 parts of methoxypropylacetate,
  300 parts of methylethylketone.

Production of the Foams (S2.1) to (S9.5.3)

In a rotor/stator mixer with cylindric mixer head, in which the rotating part and the static part are fitted at the cylindric walls faced to each other with square pegs in rectilinear parallel rows and with the following specifications:

peg height 1.2 cm,
peg density 2·cm$^{-2}$,
mean diameter of the mixer 12 cm,
ratio of the peg shearing-length to the head volume 1:45, so that the rotor-pegs comb through the stator-pegs, the compositions (W2) to (W9.5.3) are foamed with a superatmospheric pressure of 0.4 bar to fine, stable, pourable foams with the following liter-weights (measured at 20° C. and under normal pressure):

From (W2) the foam (S2.1) of 550 g/l.
From (W2) the foam (S2.2) of 640 g/l.
From (W4) the foam (S4.1) of 550 g/l.
From (V4) the foam (S4.2) of 600 g/l.
From (W4) the foam (S4.3) of 640 g/l.
From (W5) the foam (S5) of 600 g/l.
From (W6) the foam (S6) of 550 g/l.
From (W7) the foam (S7) of 550 g/l.
From (W8) the foam (S8) of 640 g/l.
Prom (W9.1) to (W9.5) the foams (S9.1.1) to (S.9.5.1) of 500 g/l.
From (W9.1) to (W9.5) the foams (S9.1.2) to (S9.5.2) of 550 g/l.
From (W9.1) to (W9.5) the foams (S9.1.3) to (S9.5.3) of 600 g/l.

Analogously as the compositions (W9) the corresponding compositions (W9 bis) to (W9 quinquies) are foamed in the above described mixer to the respective foams (S9 bis) to (S9 quinquies) and wherein with increasing content of ammonium stearate the stability of the foams increases.

APPLICATION EXAMPLE A

Tanned, split cow leather is coated with the base coat composition (V1) in a quantity of application of 40 g/m$^2$ by means of an airless spray-gun or a roller coater, dried in the tunnel drier and ironed at 80° C. and 100 bar. Then the foam (S2.1)[(C)=(C1)] is applied in a quantity of application of 250 g/m$^2$ by means of a roller coater and dried in the tunnel drier (length 15 m, temperature at the entry 55° C., with returning conveyance drier system). On the dried foam layer there is applied a pre-top lacquer (L1) in a quantity of application of 20 g/m$^2$ with a spray gun and then embossed at 90° C. and 250 bar during 3". On this there is sprayed a top lacquer (L2) twice sequentially in a quantity of application of 25 g/m$^2$ each time, dried in the tunnel drier and then ironed at 80° C. and 75 bar. There is obtained a soft white leather with a fine embossing.

Split pigskin is finished in an analogous way.

APPLICATION EXAMPLE B

Tanned, full-grain, yellow-dyed cow-leather (for upholstery) is coated with a base-coat composition (V2) in a quantity of application of 40 g/m$^2$ by means of a normal air-spray-gun (or a roller coater) and dried in the tunnel drier. Then the foam (S5) [(C)=(C2)] is applied by means of an HVLP-spray-gun in a quantity of application of 120 g/m$^2$, dried in the tunnel drier (length 15 m, entry temperature 60° C., with returning conveyance drier system) and embossed at 80° C. and 200 bar or ironed at 70° C. and 40 bar. On the embossed or ironed foam-layer is now sprayed a top-lacquer (L3) twice sequentially in a quantity of application of 30 g/m$^2$ each time, and then dried in the tunnel drier, then the treated material is milled for 6 hours and strained. There is obtained a soft, evenly finished leather of intense yellow shade.

APPLICATION EXAMPLE C

Tanned, full-grain, brown-dyed cow leather (for car upholstery) is coated with the base coat composition (V3) in a quantity of application of 40 g/m$^2$ by means of a normal air-spray-gun or a screen and dried in the tunnel drier. Then the foam (S6) [(C)=(C7)] is applied by means of an HVLP-spray-gun in a quantity of application of 150 g/m$^2$ and dried in the tunnel drier (length 15 m, temperature at the entry 60° C., with returning conveyance drier system). On the dried foam-layer is now sprayed twice sequentially a top-lacquer (L4) in a quantity of application of 40 g/m² each time, dried in the tunnel-drier and then embossed at 80° C. and 200 bar during 3", then the material is milled for 4 hours and strained. There is obtained a soft, finely embossed leather of intense brown colour.

APPLICATION EXAMPLE D

Tanned, buffed, dark-red-dyed sheepskin (clothing leather) is coated with the base coat composition (V4) in a quantity of application of 30 g/m² by means of a roller coater and dried in the tunnel drier. Then the foam (S7) [(C)=(C5)] is applied with an HVLP-spray-gun in a quantity of application of 150 g/m² and dried in the tunnel drier (length 15 m, entry temperature 60° C., with returning conveyance drier system). On the dried foam layer is now sprayed twice sequentially a top-lacquer (L6) in a quantity of application of 20 g/m² each time, dried in the tunnel-drier and then embossed at 80° C. and 200 bar during 3" or ironed at 70° C. and 40 bar, then the material is milled during 4 hours and strained. There is obtained a soft, fine leather of intense wine-red colour.

Instead of the employed lacquer compositions in the above Application Examples A to D, there may be employed the other of the lacquer compositions (L1) to (L6).

Analogously as the respective foamed compositions (S2.1), (S5), (S6) and (S7), in the above Application Examples A to D there are employed the other foamed compositions (S2.1) to (S9.5.3) on leathers of corresponding colours. Analogously, instead of the compositions (S2.1) to (S9.5.3) there are employed the respective compositions (S9 bis) to (S9 quinquies). In each case there are obtained very fine, soft leathers of corresponding colour, whereby in the embossed products the embossings are particularly fine.

What is claimed is:

1. An aqueous, spray-resistant foam (S) produced by mechanical foaming of a corresponding aqueous composition (W), wherein the aqueous phase comprises
   (A) a curable polymer system, which consists of 30 to 100% by weight of (U) an ionomeric polyurethane or a mixture of ionomeric polyurethanes, said ionomeric polyuethane or said mixture of ionomeric polyurethanes including chains derived from a polyether macrodiol and optionally (P) one or more further polymers curable at least together with (U), and
   (B) at least one foam stabilizer,
      wherein the liter weight of (S) at 20° C. and normal pressure is in the range of 400 to 700 g.

2. An aqueous foam (S) according to claim 1, further containing
   (C) at least one dye,
   (D) at least one flow-control agent and/or wetting agent,
   (E) at least one antiblocking agent and one plasticizer,
   (F) at least one delustering agent, and/or
   (G) at least one UV-absorber and/or at least one antioxidant.

3. The foam (S) according to claim 1, obtained by mixing (W) with air in a rotor/stator mixter.

4. The aqueous foam (S) according to claim 1, wherein said polyether macrodiol has an average molecular weight in the range of 300 to 5000.

5. The foam (S) according to claim 4, wherein said polyether macrodiol has an average molecular weight in the range of 500 to 1800.

6. The foam (S) according to claim 5, wherein said polyether macrodiol has an average molecular weight in the range of 800 to 1500.

7. The foam (S) according to claim 4, wherein said polyether macrodiol has an average molecular weight in the range of 1000 to 5000.

8. The foam (S) according to claim 7, wherein said polyether macrodiol has an average molecular weight in the range of 1200 to 4000.

9. The foam (S) according to claim 8, wherein said polyether macrodio has an average molecular weight in the range of 1500 to 3500.

10. The foam (S) according to claim 1, which optionally contains a cross-linking agent.

11. The foam (S) according to claim 10 in which no cross-linking agent is present.

12. An aqueous, spray-resistant stable and pourable foam (S) produced by mechanical foaming of the corresponding aqueous composition (W) wherein the aqueous phase comprises
   (A) a curable polymer system which includes (U) an ionomeric polyurethane containing polyether chains derived from a polyether macrodiol and optionally (P) one or more further polymers curable at least together with (U), and
   (B) at least one foam stabilizer,
      wherein the liter weight of (S) at 20° C. and normal pressure is in the range of 400 to 700 g, characterized in that said foam, when continuously poured under a superatmospheric pressure of 0.6 bar through a round funnel-opening of 1 cm in diameter from a height of 10 cm on a foam blanket of at least 20 cm in thickness of said foam (S), a conic cavity of at least 0.3 cm in depth is formed, which conic cavity flattens within five seconds upon interruption of the pouring jet.

13. The foam (S) according to claim 12, wherein said conic cavity has a depth of from 0.4 cm to 2 cm.

14. The foam (S) according to claim 13, wherein said conic cavity has a depth of from 0.5 cm to 1.5 cm.

15. The foam (S) according to claim 12, wherein said polyether diol is a polyether macrodiol and has an average molecular weight in the range of 300 to 5000.

16. The foam (S) according to claim 15, wherein said polyether macrodiol has an average molecular weight in the range of 500 to 1800.

17. The foam (S) according to claim 16, wherein said polyether macrodiol has an average molecular weight in the range of 800 to 1500.

18. The foam (S) according to claim 15, wherein said polyether diol is a polyether macrodiol and has an average molecular weight in the range of 1000 to 5000.

19. The foam (S) according to claim 18, wherein said polyether macrodiol has an average molecular weight in the range of 1200 to 4000.

20. The foam (S) according to claim 19, wherein said polyether macrodiol has an average molecular weight in the range of 1500 to 3500.

21. An aqueous spray resistant, stable and pourable foam (S) produced by mechanical foaming of a corresponding aqueous composition (W), wherein the aqueous phase comprises
   (A) a curable polymer system, which includes (U) an ionomeric polyurethane containing polyether chains derived from a polyether macrodiol and optionally (P) one or more further polymers curable at least together with (U), and
   (B) at least one foam-stabilizer,
      wherein the liter weight of (S) at 20° C. and normal pressures in is the range of 400 to 700 g, characterized in that said foam is readily pourable through a funnel-opening of from 0.5 cm to 3 cm in diameter under the action of a superatmospheric pressure of from 0.1 to 1 bar in a continuous flow.

22. The foam (S) according to claim 21, wherein said foam is readily pourable through a funnel-opening of from 0.6 to 2 cm in diameter under the action of a superatmospheric pressure of from 0.1 to 1 bar in a continuous flow.

23. An aqueous, spray-resistant foam (S) produced by mechanical foaming of a corresponding aqueous composition (W), wherein the aqueous phase contains
    (A) a curable polymer system which comprises (U) an ionomeric polyurethane or a mixture of ionomeric polyurethanes and optionally (P) one or more further polymers curable at least together with (U), and
    (B) at least one foam-stabilizer,
        wherein the liter-weight of (S) at 20° C. and normal pressure is in the range of 400 to 700 g characterized in that said foam (S) has a polyurethane(U) content of less than 45% by weight.

24. The foam (S) according to claim 23, wherein said foam has a polyurethane (U) content of less than 41% by weight.

25. The foam (S) according to claim 24, wherein said foam, after application and drying, substantially maintains its foam structure.

26. The foam (S) according to claim 23, wherein at least one of said polyurethanes contains an ether chain derived from a polyether macrodiol.

27. The foam (S) according to claim 26, wherein said polyether macrodiol is a polyalkyleneglycol macrodiol.

28. The foam according to claim 23, wherein said curable polymer system includes a mixture of ionomeric polyurethane compositions, at least one of which includes polyalkyleneglycolether chains.

29. An aqueous, spray-resistant stable and pourable foam (S) produced by mechanical foaming of the corresponding aqueous composition (W), wherein the aqueous phase comprises
    (A) a curable polymer system, which consists of (U) an ionomeric polyurethane containing chains derived from macrodiols and optionally (P) one or more further polymers curable together with (U) and
    (B) at least one foam stabilizer,
        wherein (U) constitutes 30 to 100% by weight of (A), (B) amounts to at least 0.1% by weight of (W), the litre weight of (S) at 20° C. and normal pressure is in the range of 400 to 700 g and the aqueous foam (S) is pourable fluently and without interruption through a funnel opening of 0.5 to 3 cm diameter under the action of a superatmospheric pressure of from 0.1 to 1 bar.

30. An aqueous, spray-resistant stable and pourable foam (S) produced by mechanical foaming of the corresponding aqueous composition (W), wherein the aqueous phase comprises
    (A) a curable polymer system, which consists of (U) an ionomeric polyurethane containing chains derived from macrodiols and optionally (P) one or more further polymers curable together with (U) and
    (B) at least one foam stabilizer,
        wherein (U) constitutes 30 to 100% by weight of (A), (B) amounts to at least 0.1% by weight of (W), the litre weight of (S) at 20° C. and normal pressure is in the range of 400 to 700 g and the content of (U) in (W) is less than 45% by weight.

31. An aqueous, spray-resistant stable and pourable foam (S) produced by mechanical foaming of the corresponding aqueous composition (W), wherein the aqueous phase comprises
    (A) a curable polymer system, which consists of (U) an ionomeric polyurethane or mixture of ionomeric polyurethanes comprising the reaction product of a mixture including an ionizable component, a polyether macrodiol having a molecular weight in the range of from 300–5000, a diisocyanate and a chain extenders, and optionally (P) one or more further polymers curable together with (U) and
    (B) at least one foam stabilizer,
        wherein (U) constitutes 30 to 100% by weight of (A), (B) amounts to at least 0.1% by weight of (W), the litre weight of (S) at 20° C. and normal pressure is in the range of 400 to 700 g.

* * * * *